United States Patent [19]

Price et al.

[11] Patent Number: 4,534,172
[45] Date of Patent: Aug. 13, 1985

[54] MASTER CYLINDER ASSEMBLY FOR A VEHICLE HYDRAULIC BRAKING SYSTEM

[75] Inventors: Anthony G. Price, Birmingham; Graham J. Gornall, West Midlands, both of England

[73] Assignee: Lucas Industries public limited company, Birmingham, England

[21] Appl. No.: 544,955

[22] Filed: Oct. 24, 1983

[30] Foreign Application Priority Data

Nov. 2, 1982 [GB] United Kingdom ............ 8231340

[51] Int. Cl.³ .................. B60T 11/20; B60T 15/38; B60T 15/46
[52] U.S. Cl. .......................... 60/578; 60/562; 60/581
[58] Field of Search ............ 60/581, 574, 578, 585, 60/589, 592

[56] References Cited

U.S. PATENT DOCUMENTS

| 2,816,422 | 12/1957 | Fletcher | 60/578 |
| 3,336,597 | 8/1967 | Fay | 60/581 |
| 4,006,593 | 2/1977 | Edwards | 60/581 |
| 4,231,224 | 11/1980 | Edwards et al. | 60/589 X |
| 4,388,806 | 6/1983 | Szarka et al. | 60/581 X |

FOREIGN PATENT DOCUMENTS 2074675 11/1981 United Kingdom .
2084678 4/1982 United Kingdom .

Primary Examiner—Abraham Hershkovitz
Assistant Examiner—George Kapsalas
Attorney, Agent, or Firm—Oldham, Oldham & Weber Co.

[57] ABSTRACT

In a master cylinder assembly comprising two pedal-operated master cylinders, each master cylinder comprises a pedal-operated piston of stepped outline working in a complementary stepped bore in a housing and having an inner end of smaller area carrying a first seal and an outer end of greater area carrying a second seal, a pressure space in the bore in advance of the inner end of the piston, a quick-fill chamber defined in the bore between the inner and outer ends of the piston, a normally-open recuperation valve providing communication between a reservoir for fluid and the pressure space at least when the piston is in a retracted position, and a normally-closed pressure-limiting valve assembly between the quick-fill chamber and the same or a second reservoir. The pressure-limiting valve assembly is adapted to open at a threshold value when the piston is moved in a brake-applying direction and following closure of the recuperation valve and the transfer of fluid to the pressure-space to take up the braking clearances, further movement of the piston in the same direction pressurizes fluid in the pressure space to apply the brake. The two quick-fill chambers are connected through a transfer passage so that fluid can be transferred between the two quick-fill chambers when both master cylinders are operated simultaneously at least until the said threshold value is attained.

6 Claims, 3 Drawing Figures

MASTER CYLINDER ASSEMBLY FOR A VEHICLE HYDRAULIC BRAKING SYSTEM

FIELD OF THE INVENTION

This invention relates to master cylinder assemblies for vehicle hydraulic braking systems of the kind in which separate master cylinders are connected by a transfer passage through which fluid can be transferred between the master cylinders when both master cylinders are operated simultaneously, in order to compensate for differential wear of friction linings of brakes applied by respective master cylinders, and communication between the master cylinders is adapted to be cut-off by transfer valve means when one master cylinder is operated on its own.

BACKGROUND OF THE INVENTION

In some known hydraulic braking systems it is desirable for each master cylinder to be of the so called "quick-fill type", for example as disclosed in GB-A No. 2 074 675, so that, on actuation, a relatively large volume of fluid is applied to a respective brake with the result that braking clearances are rapidly taken up. Specifically the volume of a quick-fill chamber at relatively low pressure decreases as fluid is transferred to the brake through a pressure space at relatively high pressure, past a seal on the piston of the master cylinder, until a threshold value is attained at which a valve assembly is operative to place the quick-fill chamber in communication with a reservoir for fluid.

In known master cylinder assemblies of the kind set forth, for example as disclosed in GB-A No. 2 084 678, the transfer passage provides direct communication between the pressure spaces of the master cylinders, and communication between the pressure spaces is cut-off by the transfer valve means when a master cylinder is operated on its own. Connecting the two pressure spaces may mean that the effective length of the master cylinder assembly has to be increased to accommodate the transfer connection and the transfer valve means. When each master cylinder is of the quick-fill type, failure of the transfer connection will lead to failure of the quick-fill chambers and the pressure spaces when both master cylinders are actuated simultaneously and, depending upon the construction of the transfer valve means, may lead to failure of the quick-fill chamber and the pressure space of a single master cylinder, when that master cylinder is operated on its own.

SUMMARY OF THE INVENTION

According to our invention, in a master cylinder assembly of the kind set forth each master cylinder comprises a pedal-operated piston of stepped outline working in a complementary stepped bore in a housing and having an inner end of smaller area carrying a first seal and an outer end of greater area carrying a second seal, a pressure space in the bore in advance of the inner end of the piston, a quick-fill chamber defined in the bore between the inner and outer ends of the piston, a normally-open recuperation valve providing communication between a reservoir for fluid and the pressure space at least when the piston is in a retracted position, and a pressure-limiting valve assembly between the quick-fill chamber and the same or a second reservoir, the pressure-limiting valve assembly being closed, at least when the piston is in the retracted position, a one-way valve incorporated in the pressure-limiting valve assembly and movable between an open position to provide communication between the respective reservoir and the quick-fill chamber through the pressure-limiting valve assembly when the piston is in the retracted position, and a closed position in response to movement of the piston in a brake-applying direction to isolate the said respective reservoir from the quick-fill chamber, the pressure-limiting valve being adapted to open at a threshold value when the piston is moved in the brake-applying direction and following closure of the recuperation valve and the transfer of fluid to the pressure space to take up the braking clearances, with further movement of the piston in the same direction pressurizing fluid in the pressure space to apply the brake, and the two quick-fill chambers are connected through the transfer passage so that fluid can be transferred between the two quick-fill chambers when both master cylinders are operated simultaneously at least until the said threshold value is attained.

Connecting the quick-fill chambers enables compensation for differential wear of the friction linings to be achieved up to a point at which the limiting valve assemblies open. In practice this will enable substantially full compensation for differential wear to be achieved, since substantially all compensation normally takes place during movement of friction members to take up braking clearances and substantially no further compensation is necessary during the further additional movement of the friction members in applying the brake.

Since the transfer passage connects the quick-fill chambers, the axial length of the master cylinder assembly is conserved and it is not necessary to increase the axial length thereof in order to accommodate the transfer passage and the transfer valve means.

In addition, upon failure of the transfer connection which prevents compensation being achieved, although the quick-fill chambers become inoperative, the two pressure spaces are still operative. This enables the master cylinders to be operated, either simultaneously or independently. Also failure of one of the pressure spaces will not affect the operation of the other master cylinder.

In each of the above failure modes the operator will become aware of a deficiency in the system, either by increased pedal travel, or as a result of unbalanced braking.

Preferably each recuperation valve is of the axially movable type comprising a head which is movable relative to a seating surrounding a recuperation port and is carried by a stem which is guided for axial movement in a bore co-axial with the piston.

The stem may be coupled to the piston in which the bore is provided and the seating may be disposed in the housing at the end of the bore in the master cylinder in which the pedal-operated piston works. Alternatively the stem may be guided to slide in a bore in the end of the housing remote from the pedal-operated piston, and the seating surrounds a passage in the piston which leads to the reservoir through the quick-fill chamber. In this latter construction a single reservoir is provided whereas, in the former, the recuperation port may be connected to a different reservoir otherwise an external connection of substantial length may be required to connect the recuperation port and the quick-fill chamber through the pressure-limiting valve.

DESCRIPTION OF THE DRAWINGS

Some embodiments of our invention are illustrated in the accompanying drawings in which.

DESCRIPTION OF THE PREFERRED EMBODIMENTS

Figure 1:
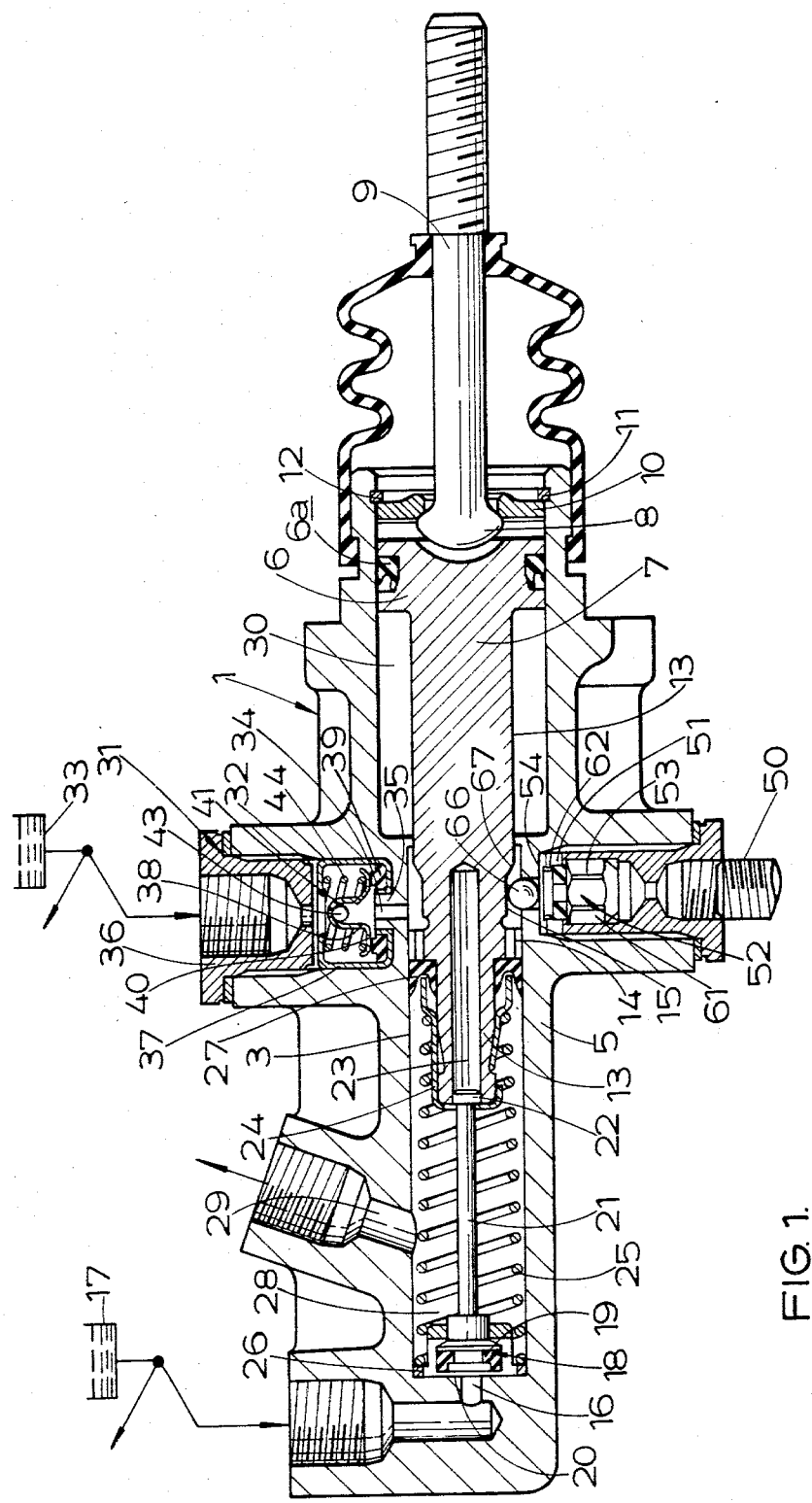
FIG. 1 is a longitudinal section through a pedal-operated master cylinder comprising one of a pair of master cylinders which constitute a dual master cylinder assembly.

A dual hydraulic master cylinder assembly comprises two master cylinders 1 which are identical in construction and formed by parallel stepped bores 3 each provided in a separate body 5. The two bodies 5 are identical in construction and can be installed in any convenient spaced locations in a vehicle.

As the two master cylinders are identical in construction, only one, which is illustrated, need be described.

A piston 7 of stepped outline working in the bore 3 is engaged at its rear end portion 6 by a part-spherical head 8 on a pedal-operated push-rod 9. The portion 6 is of greater area and carries a seal 6a. A stop for the head 8 is formed by an annular collar 10 located by a spring ring or circlip 11 received in an annular groove 12 in the bore 3.

The piston 7 is provided at an intermediate point in its length with an apertured flange 14 working in the portion of bore 3 which is of smaller area. An annular recess 15 is located in the piston 7 to the rear of the flange 14, and a land 13 extends from the outer end of the recess 15 to the portion 6 of the piston 7.

A recuperation port 16 at the forward end of the body 5 for connection to a reservoir 17 for hydraulic fluid is controlled by a recuperation valve 18 comprising a head 19 for engagement with a seating 20 surrounding the port 16. The head 19 is carried by the forward end of an axially extending stem or rod 21 of which the opposite end carries an enlarged head 22 guided to slide in a longitudinally extending bore 23 in the adjacent end of the piston 7. The head 22 is retained within the bore 23 by a thimble 24 which fits over the inner end of the piston 7. The thimble 24 forms an abutment for one end of a compression return spring 25 of which the opposite end acts on a cage 26 in which the head 19 is housed. In the position shown in the drawing the spring 25 urges the piston 7 into a retracted position with the head 19 spaced from the seating 20 by the engagement of the thimble 24 with the head 22. The thimble also acts to retain a radial seal 27 on the piston 7 adjacent to the flange 14.

A pressure space 28 defined in the bore 3 in front of the piston 7 is adapted to be connected to a vehicle brake through an outlet port 29. Normally the pressure space 28 of one master cylinder will be connected to brakes on one side of a vehicle, for example an agricultural tractor, and the pressure space of the other master cylinder will be connected to brakes on the opposite side of the tractor. Thus both master cylinders will be operated simultaneously to retard the vehicle, and independently for steering.

A quick-fill chamber 30 is defined in the bore 3 between the portions 6 and 14 of the piston 7 and fluid can pass from the quick-fill chamber 30 and into the pressure space 28 through apertures in the flange 14 and past the seal 27.

A pressure-limiting valve assembly 31 housed in a valve chamber 32 in the wall of the body 5 controls communication between the quick-fill chamber 30 and a reservoir 33 for fluid through a port 34 in a central spigot 35. One reservoir may replace the two reservoirs 17 and 33 with the provision of suitable external connections.

The pressure-limiting valve assembly 31 comprises a pre-assembled valve unit retained within the valve chamber 32 by means of a union 36 which is screwed into its outer end. The valve unit comprises a valve mechanism held captured within an annular metal cage 37 having a base wall which sits on the base of the valve chamber 32 around the spigot 35, an annular side wall, and an inwardly directed top flange. The valve mechanism comprises an annular seal 39 of elastomeric material which rests against the base of the cage 37, a valve member 38 which is generally of top hat outline and includes a radial flange 40 for co-operation with the seal 39 and an internal valve seat 41 at its upper end, a ball 43 held captive within the valve member 38 by indentations in the valve member 38 and co-operating with the seat 41 to form a one-way valve with the ball 43, normally spaced from the seat 41, and a spring 44 acting between the flanges 40 and 38 to urge the flange 40 into sealing contact with the seal 39.

The two quick-fill pressure chambers 30 of the master cylinders 1 are interconnected by a transfer passage comprising a transfer passage 50 which is connected at opposite ends to radial outlet passages 51 in the walls of the body 5.

A transfer valve 52 is housed within each passage 51, between the respective quick-fill chamber 30 and the transfer passage 50. The transfer valve 52 comprises a valve member 53, which is unsprung, for engagement with a seating 54 formed by the material of the body 5. The valve member 53 comprises a piston 61, and a seal 62 of elastomeric material, suitably rubber, mounted on one end of the piston 61, the seal 62 being engageable with the seating 54.

The seal 62 is provided with a plurality of integral, discrete, deformable, and collapsible resilient axially extending projections on the circumference of its face adjacent to the seating 54, and in a normal intermediate position the valve member is urged by gravity slightly away from the seating 54 so that the projections and the remainder of the face of the seal 62 are spaced from the seating 54. This defines a leak path to accommodate any effective increase in volume due to heating of fluid in the transfer passage 50.

A thrust member 66 in the form of a ball is guided in a portion of the passage 51 leading into the bore 3 and is received in a recess 15 in the outer face of the piston 7.

In the normal inoperative "brake-off" position shown in the drawings, the pressure spaces 28 are in open communication with the reservoir 17 through the open recuperation valves 18, the quick-fill chambers 30 are in open communication with the reservoir 33 through the pressure-limiting valve assemblies 31, since the balls 43 are spaced from the seatings 41, and the two transfer valves 52 are open to provide unrestricted communication between the two quick-fill chambers 30 through the transfer passage 50.

When one of the master cylinders, say the master cylinder 1, is operated a short forward movement of the piston 7 with corresponding compression of the spring 25 is sufficient to cause the head 19 to engage with the seating 20 to isolate the reservoir 17 from the pressure space 28. During this movement fluid displaced from the quick-fill chamber 30 by the entering volume of the larger diameter portion 6 is operative to urge the ball 43 into engagement with the seating 41 to isolate the quick-fill chamber from the reservoir 33, in addition displacing fluid into the pressure space 28 through the apertured flange 14 and the seal 27, and into the pipeline 50.

Simultaneously, or almost immediately thereafter, the piston 7 also urges the thrust member 66 radially outwardly by the engagement therewith of an inclined annular face 67 at the end of the recess 15 remote from the flange 14. This movement urges the valve member away from the adjacent seating 54 and into a fully open position. Further movement of the piston 7 in the same direction causes fluid to flow through the transfer passage 50 through the open transfer valve which, in turn, creates a pressure drop across the valve member of the other master cylinder, urging that valve member towards the adjacent seating 54 in the body of that master cylinder. The resilient projections on the seal 62 collapse so that the face of the seal can engage fully with the seating 54 thereby closing the transfer valve 52 of the said other master cylinder to isolate the quick-fill chambers 30 of the master cylinders from each other.

The transfer of fluid from the quick-fill chamber 30 and into the pressure space 28 thereafter continues until the pressure in the quick-fill chamber reaches the threshold level, chosen to correspond substantially to a point at which the braking clearances are taken up. At the threshold level the pressure exerts a force on the radial flange 40 which is sufficient to overcome the load in the spring 44, with the result that the radial flange 40 moves away from the seal 39 to allow unrestricted flow from the quick-fill chamber 30 to the reservoir 33. The pressure in the quick-fill chamber 30 then drops below that in the pressure space 28 and the valve 27 seals against the bore 3 to prevent further fluid transfer from the quick-fill chamber to the pressure space 28. Further operation of the pedal then operates the master cylinder 1 in the usual way with the piston 7 pressurizing fluid in the pressure space to apply the brake.

When the master cylinders are operated simultaneously the thrust members 66 both act in opposite directions to hold their respective valve members 53 away from the seatings 54, so that the quick-fill chambers are in full communication through the transfer passage 50 to compensate for differential wear of the linings of the respective brakes which the two master cylinders operate.

Compensation for differential wear takes place up to the threshold level at which the valve assemblies 31 open as described above.

Figure 2:
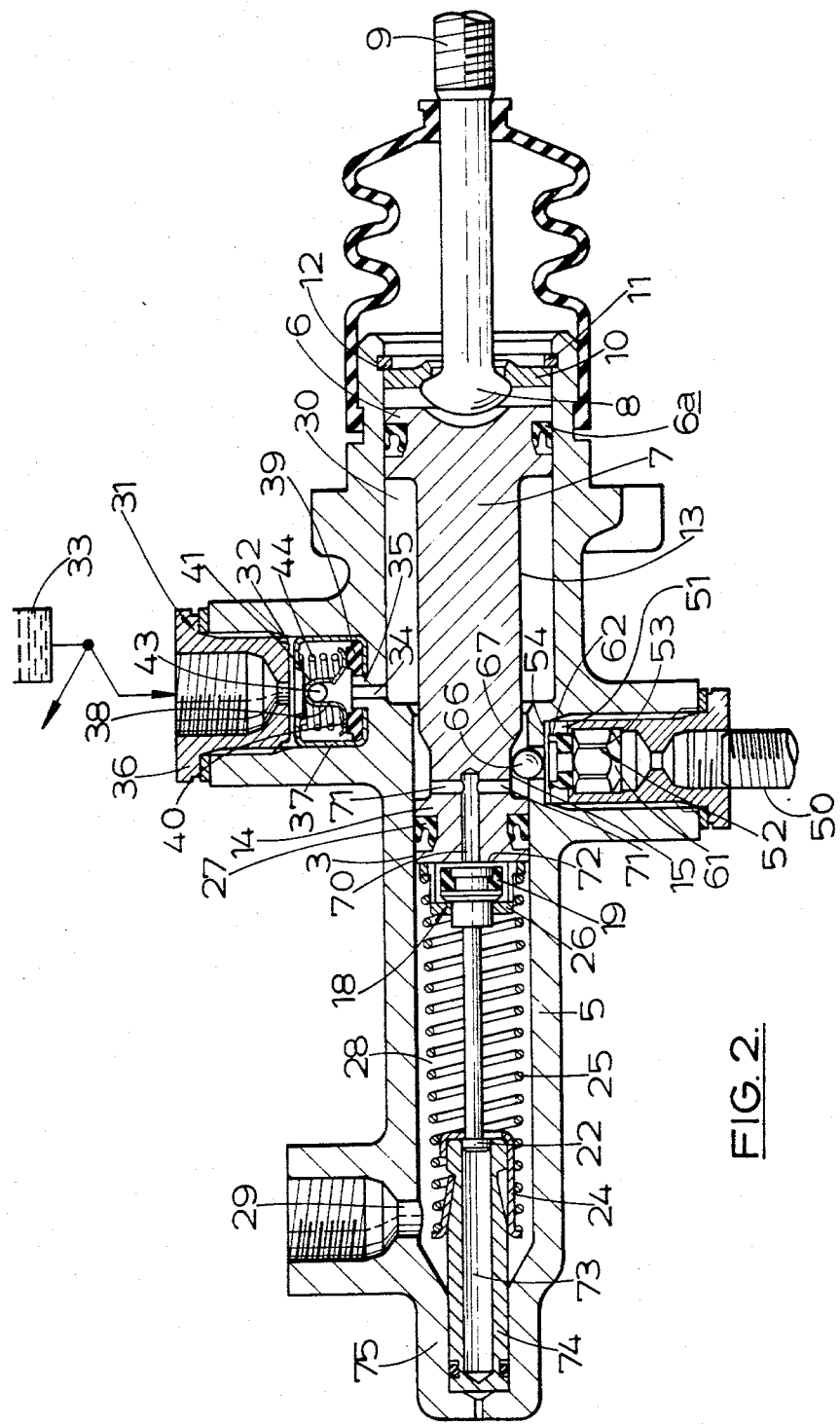
FIG. 2 is a longitudinal section similar to FIG. 1 but of a modified construction.

In the master cylinder illustrated in FIG. 2 of the accompanying drawings the arrangement of the recuperation valve 18 is reversed to reduce the overall axial length of the master cylinder. As illustrated the passage 23 in the piston 7 is replaced by an axial passage 70 which leads into the quick-fill chamber 30 through communicating radial passages 71, and the head 19 co-operates with a seating 72 surrounding the passage 70. The head 22 on the stem works in a passage 73 in a member 74 which is received in a bore 75 in the end of the body 5 remote from the piston 7, and the thimble 24 fits over the inner end of the member 74 to retain the head 22 within the bore 75.

Since the quick-fill chamber 30 is normally in open communication with the reservoir 33 through the valve assembly 31, the reservoir 33 also acts to replenish the pressure space 28.

When the master cylinder is operated the initial movement of the piston 7 causes the seating 72 to engage with the head 19 which isolates the pressure space 28 from the reservoir. Thereafter the head 19 is carried along with the piston 7.

The construction and operation of the master cylinder 1 is otherwise the same as that of FIG. 1 and corresponding reference numerals have been applied to corresponding parts.

Figure 3:
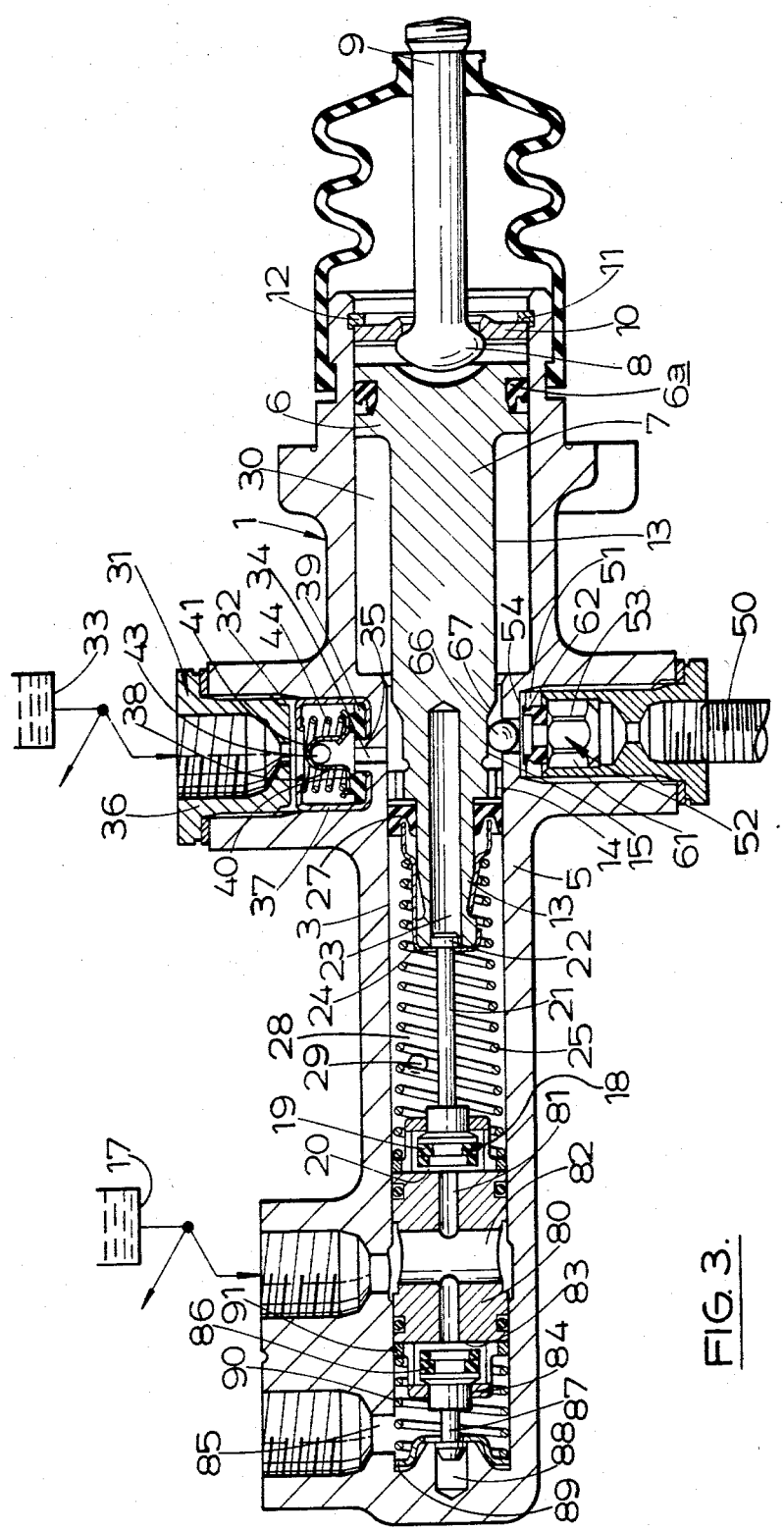
FIG. 3 is a longitudinal section of a pedal-operated tandem master cylinder.

The tandem master cylinder illustrated in FIG. 3 is a modified version of FIG. 1. In the tandem master cylinder of FIG. 3, the portion of the bore 3 which is of smaller diameter is extended axially to accommodate a secondary or floating piston 80. The piston 80 is provided with an axial through-bore 81 which is traversed by a diametral passage 82. The seating 20 comprises the face at the end of the piston 80 which faces the head 19 and the opposite end face of the piston 80 comprises a seating 83 for a second recuperation valve 84 which leads to an outlet port 85 for connection to an auxiliary braking system.

The valve 84 comprises a head 86 carried by a stem 87 which is guided to slide in a bore 88 in the end of the body 5 and normally the head 86 is held out of engagement with the seating 83 by a plate 89 forming an abutment for one end of a spring 90 of which the opposite end acts on a cage 91 in which the head 86 is retained. In this position the outlet port 85 communicates with the reservoir 17, through the passages 81 and 82 in the piston 80, through which the pressure space 28 is also in communication with the reservoir.

After the head 19 has engaged with the seating 20 further movement of the piston 7 is transmitted to the secondary piston 80 through the volume of fluid trapped in the pressure space 28. The secondary piston 80 is thereby advanced in the bore 3 which causes the second recuperation valve 84 to close and isolate the outlet 85 from the reservoir 17. Thereafter the fluid in the pressure space 28 is pressurised as described above with an equal pressure being generated in a second pressure space defined between the secondary piston 80 and the closed end of the bore.

The construction and operation of the master cylinder of FIG. 3 is otherwise the same as FIG. 1 and corresponding reference numerals have been applied to corresponding parts.

We claim:

1. A master cylinder assembly for a vehicle hydraulic braking system comprising first and second separate master cylinders for applying respective brakes, a transfer passage connecting said master cylinders and through which fluid can be transferred between said master cylinders when both said master cylinders are operated simultaneously in order to compensate for differential wear of friction linings of said brakes, and transfer valve means for cutting-off communication between said master cylinders when one of said master cylinders is operated on its own, wherein each said master cylinder comprises a housing having a bore of stepped outline, a pedal-operated piston of complementary stepped outline working in said bore, said piston having an inner end of smaller area carrying a first seal and an outer end of greater area carrying a second seal, means defining a pressure space in said bore in advance of said inner end of said piston, means defining a quick-fill chamber in said bore between said inner and outer ends of said piston, a reservoir for fluid, a normally-open recuperation valve providing communication between said reservoir for fluid and said pressure space at least when the piston is in a retracted position, and a pressure-limiting valve assembly between said quick-fill chamber and said reservoir or a second reservoir, said pressure-limiting valve assembly being closed, at least when said piston is in the retracted position, a one-way valve incorporated in said pressure-limiting valve assembly and movable between an open position to provide communication between said respective reservoir and said quick-fill chamber through said pressure-limiting valve assembly when the piston is in the retracted position, and a closed position in response to movement of said piston in a brake-applying direction to isolate the said respective reservoir from said quick-fill chamber, with said first seal preventing fluid communication from said pressure space to said quick-fill chamber when said piston is moved in said brake-applying direction, said pressure limiting valve assembly being adapted to open at a threshold value pressure when said piston is moved in said brake-applying direction and following closure of said recuperation valve and the transfer of fluid from said quick-fill chamber to said pressure space to take up the braking clearances, with further movement of said piston in the same direction pressurizing fluid in said pressure space to apply said brake, and wherein the said two quick-fill chambers are connected through said transfer passage so that fluid can be transferred between said two quick-fill chambers when said master cylinders are operated simultaneously at least until said threshold value is attained.

2. A master cylinder assembly as claimed in claim 1, wherein said piston has a bore, and each recuperation valve is of the axially movable type comprising a head, a seating surrounding a recuperation port and relative to which said head is movable, and a stem carrying said head and guided for axial movement in said bore in said piston.

3. A master cylinder assembly as claimed in claim 2, wherein the stem is coupled to said piston in which said bore is provided, and said seating is disposed in said housing at the end of the bore in said master cylinder in which said pedal-operated piston works.

4. A master cylinder assembly as claimed in claim 3, wherein said recuperation port is connected to a different reservoir.

5. A master cylinder assembly as claimed in claim 2, wherein said stem is guided to slide in a bore in the end of said housing remote from said pedal-operated piston, and said seating surrounds a passage in said piston which leads to said reservoir through said quick-fill chamber.

6. A master cylinder assembly as claimed in claim 5, wherein a single reservoir is provided for both said master cylinders.

* * * * *